United States Patent [19]
Bergmann et al.

[11] Patent Number: 5,019,619
[45] Date of Patent: May 28, 1991

[54] SINGLE-COMPONENT SEALING SUBSTANCES

[75] Inventors: Franz-Josef Bergmann, Laudenbach; Lothar Hockenberger, Ludwigshafen; Waltraut Schadt, Lampertheim, all of Fed. Rep. of Germany

[73] Assignee: Ruetgerswerke Aktiengesellschaft, Frankfurt am Main, Fed. Rep. of Germany

[21] Appl. No.: 315,794

[22] Filed: Feb. 27, 1989

[30] Foreign Application Priority Data

Mar. 18, 1988 [DE] Fed. Rep. of Germany ....... 3809104

[51] Int. Cl.$^5$ .......................... C08K 3/22; C08L 27/12
[52] U.S. Cl. .................................... 524/405; 524/436; 524/609
[58] Field of Search ........................ 524/405, 436, 609

[56] References Cited

U.S. PATENT DOCUMENTS

| | | |
|---|---|---|
| 3,275,579 | 9/1966 | Stierli . |
| 3,349,047 | 10/1967 | Sheard . |
| 3,402,115 | 9/1968 | Campbell . |
| 3,402,155 | 9/1968 | Kutch . |
| 3,499,864 | 3/1970 | Millen . |
| 3,586,660 | 6/1971 | Sakata . |
| 3,607,845 | 9/1971 | Ireland et al. ........................ 524/609 |
| 3,645,956 | 2/1972 | Doughty et al. . |
| 3,654,241 | 4/1972 | Doughty et al. . |
| 3,714,132 | 1/1973 | Nakanishi et al. . |
| 3,716,515 | 2/1973 | Wilhelm et al. . |
| 3,748,313 | 7/1973 | Bulbenko et al. ..................... 524/609 |
| 4,100,148 | 7/1978 | Hockenberger et al. ........... 523/211 |
| 4,689,395 | 8/1987 | Bergmann et al. ................. 528/374 |

FOREIGN PATENT DOCUMENTS

| | | |
|---|---|---|
| 2615963 | 10/1977 | Fed. Rep. of Germany . |
| 8607369 | 12/1986 | PCT Int'l Appl. . |
| 1371177 | 10/1974 | United Kingdom . |

OTHER PUBLICATIONS

*Chemical Abstracts*, vol. 87, Abstract No. 186239j, (1977).

*Primary Examiner*—Paul R. Michl
*Assistant Examiner*—Christopher P. Rogers
*Attorney, Agent, or Firm*—Beveridge, DeGrandi & Weilacher

[57] ABSTRACT

Single-component sealing compositions based on mercapto-terminated polymers and/or oligomers and latent hardeners are disclosed. The substances are substantially water-free and the hardeners are alkali perborate monohydrates.

8 Claims, No Drawings

SINGLE-COMPONENT SEALING SUBSTANCES

INTRODUCTION AND BACKGROUND

The present invention relates to novel, single-component, humidity-curing caulking and sealing substances based on mercapto-terminated polymers and/or oligomers, so-called polysulfides.

Compositions known in the art are extendable at room temperature and cure into a rubber-elastic product; they are highly significant in industrial sealing and bonding applications wherein the bonding or sealing site must be elastic.

The materials are mostly used in the form of two-component systems; namely, the compound with terminal mercapto groups on one hand and the oxidizer on the other are packed and stored separately, and then the two components are mixed together shortly before use. For simpler and more reliable applications, more and more users increasingly desire single-component compounds; that is, mixtures that are capable of remaining stable in storage which simultaneously contain the polymer and the oxidizer and which will harden when put to use upon contact with the atmospheric humidity at room temperature.

Single-component systems based on such various oxidizers as alkaline earth peroxide, zinc peroxide, chromate, alkali permanganate or lead dioxide are known. Each such system offers specific advantages, but also incurs specific drawbacks. At present, the best industrial single-component caulking and sealing substances based on mercapto-ended compounds contain manganese dioxide as the oxidizer.

In their cured state, the compositions based on manganese dioxide are soft, permanently elastic substances nevertheless exhibiting high resiliency properties, and even when aging, they undergo no significant stiffening.

Regrettably, however, manganese dioxide does not permit the manufacture of white compounds. This drawback is a significant problem because the user, and in particular the architect, increasingly needs white, single-component sealants.

Corresponding single-component systems are already known whereby white substances can be prepared.

Illustratively U.S. Pat. No. 3,349,047 discloses white polysulfide masses using an alkaline earth peroxide, as a rule calcium peroxide, as a latent hardener. However such substances have been found to be too stiff after curing for many applications. The attempt already has been made to lower the elastic modulus of these substances by simultaneously employing monofunctional mercapto compounds as so-called chain stoppers. Problems arise, however, as this entails reduction of the internal strength and resiliency of the product.

Other white products are known. Thus, U.S. Pat. Nos. 3,275,579; 3,402,155; 3,499,864 and German OLS 18 00 982; 20 62 259 and 21 07 971 disclose white, single-component polysulfides containing zinc oxide or zinc peroxide as hardeners. While they differ always in the kind of activator used for the oxidizer, they nevertheless all share the same basic difficulty; that is, the cured substances harden further by undesired secondary reactions during aging and become too stiff. Moreover, this problem cannot be overcome by adding plasticizers to the composition.

SUMMARY OF THE INVENTION

Accordingly, one object of the invention is to create white single-component sealing compositions based on mercapto-terminated polymers and/or oligomers which upon contact with atmospheric humidity will cure to form a soft-elastic product having good recovery and where the aging of the cured compound so formed is free of significant undesired rigidification.

In attaining the above and other objects of the invention, one feature resides in providing single-component, humidity-curing sealing compositions on mercapto-terminated polymers and/or oligomers and latent hardeners which substances are substantially free of water, and containing an effective amount of an alkali perborate monohydrate to serve as the latent hardener. These compositions further contain barium oxide or strontium oxide as the accelerator in a sufficient amount to function as such. Fillers and plasticizers can also be present and are selected so that their aqueous slurries or aqueous extracts are neutral or alkaline. In addition, the compositions have a heavy-metal content for the total mixture which is less than 0.01%. In more detail it has been found that the content of the alkali perborate monohydrate should not exceed the stoichiometrically required amount by more than 3 g/100 g of the mercapto-terminated polymer and/or oligomer.

It has further been found that single-component sealing compositions are especially useful when they additionally contain 0.05-2% by weight of a complexing agent. Representative of such agents is an alkali salt of ethylene diaminotetraacetic acid or of nitrilotriacetic acid. Still further examples of the complexing agent is an alkali polyphosphate, as well as N-salicylidene ethylamine, N,N'-disalicylidene ethylene, N,N'-disalycidene triethylene diamine.

A further feature of the invention resides in a process for preparing the foregoing caulking and sealing compositions comprising intensively mixing together mercapto-terminated polymers and/or oligomers, and at least one of the group of fillers, plasticizers, and dessicants and, optionally, at least one of the group of solvents, coupling agents, pigments, complexing agents, accelerators, thixotropizing agents and retarders. The resulting mixture contains less than 0.01% of heavy metals. The mixing is carried out intensively under vacuum. The resulting dry mixture is then mixed with a paste that is independently made by mixing alkali perborate and barium oxide or strontium oxide with plasticizers.

Now it was found that a storage-stable mixture is achieved if an anhydrous, mercapto-terminated polymer and/or oligomer and, optionally, water-free fillers and additives and plasticizers are mixed with sodium- or potassium-perborate monohydrate and if this mixture is stored tightly against air and humidity, provided the individual components of the mixture are selected such that the content of heavy metals in the total mixture be less than 0.01%.

If the mixture does contain such plasticizers and fillers and additives that their aqueous slurries or their aqueous extracts are neutral or alkaline, then this mixture will form in air (of at least 50% relative humidity) a thin skin within about two hours and will cure fully within a few days. All liquid polymers on oligomers or mixtures of oligomeric and polymeric compounds with at least two terminal mercapto groups, for instance polysulfide polymers, polymeric thioethers and the like are suitable for the sealants of the invention. These polymeric and oligomeric are well known in the art.

Preferred liquid, mercapto-terminated components suitable for purposes of the invention are polysulfide polymers and oligomers of the general formula $HS-(RSS)_n-RSH$, where n is between 5 and 25 and R denotes an alkyl-, alkylether- or alkylthioether-residue. The preferred residue R is a bis-ethyl-formal residue of formula:

$$-C_2H_4-O-CH_2-O-C_2H_4-.$$

Depending on the value of n and the size of the residue R, the molecular weight of these compounds will be between 500 and 8,000. These polysulfide compounds exhibit a room-temperature viscosity of 0.5 to 80 Pa.s.

Potassium and sodium perborate monohydrate can be used as alkali perborates. It was found that neither the tetra nor the tri-hydrate of the perborates nor sodium perborate anhydrite (oxoborate) are suitable for the substances of the invention. The amount of perborate used must correspond at least to the stoichiometric quantity required for the oxidation-formation of disulfide bridges from the mercapto-groups.

It is conventional industrial practice to add to such polymer mixtures an excess amounting to a multiple of the stoichiometrically required amount of oxidizer in order to enhance the rate of curing. It was found with respect to the present invention that the curing rate is much less dependent than heretofore expected on the excess of perborate. Instead attention must be paid to the fact that perborates, being susceptible oxidizers, easily dissociate. Accordingly, the quantity of the alkali perborate monohydrate used should not exceed the stoichiometrically required amount by more than 2 g/100 of mercapto-terminated polymer and/or oligomer.

In the manner of any other conventional sealant, the compositions of the present invention in addition to the polymer-hardener system also contain significant amounts of plasticizers, fillers and additives. These additional components (plasticizers, fillers and additives) are well known in the polysulfide sealant polymer art and any suitable ones can be used for purposes of this invention. The amounts of these ingredients to be used are also known in the art. Because these sealant composition are storage-stable mixtures which harden when exposed to humidity, they must be substantially free of water. In other words, the initial products must be essentially water-free and may be dried further when mixed (under vacuum). Ordinarily the plasticizers and liquid mercapto-terminated polymers or oligomers contain about 0.1-0.3% water. The water content of conventional, commercial, dry-stored fillers is in the range of 0.2-0.5%.

It was found in accordance with the present invention that the single-component system of the invention is not unduly susceptible to humidity, so that only moderate drying is required, which can be skipped, if commercial dessicants are used adequately. On the other hand the system of the invention also behaves in a generally known way, namely that storage stability will be better with lower mixture water content in the mixture. It was found that for a water content of 0.15-0.2% in the mixture the storage stability will be 4 weeks at 70° C. and the curing rate (23° C.; relative humidity 50%) is 0.5 mm/d.

The system of the invention is more sensitive to and reacts far more sharply to traces of heavy metals or their salts, which may be present in the mercapto-terminated polymers and additives, most of all in the fillers. The presence of traces of heavy metals tends to increase during mixing caused by the abrasion in the apparatus of the mixer.

Heavy metals in this sense are the metals of the 1st, 6th, 7th, and 8th secondary groups of the Periodic System of Elements, and in particular iron, cobalt, nickel, copper, vanadium, manganese, molybdenum or tungsten. Such heavy metals or heavy metal ions catalyze the decomposition of the perborate during the storage of the sealant and thereby reduce the storage stability of the composition. It was found that single-component caulking and sealing compounds based on mercapto-terminated polymers and/or oligomers wherein the alkali perborate monohydrate is present as a latent hardener may contain up to 0.01% of heavy metal. Only when the sum of the catalytically active heavy metals exceeds 0.01% will the storage stability be significantly reduced. While the substance then remains extrudable, it no longer cures when exposed to humidity.

When the components are being compounded together, individual components are permitted to contain a higher proportion of heavy metal provided the stated amount not be exceeded in the full mixture. This is significant in that many natural fillers contain heavy metals, in particular iron, from 0.02-0.04% and may indeed be used in the compositions of the invention as long as the total content of heavy metals is not exceeded.

It was found furthermore that adding 0.05-2% by weight of a complexing agent to the composition of the invention improves storage stability. In particular it was found that the proportion of heavy metal introduced by abrasion of the mixer apparatus may be neglected if a complexing agent is added. Effective complexing agents illustratively are alkali phosphates, the tetracetylethylene diamine, alkali salts of ethylene diamino-tetraacetic acid or nitrilo triacetic acid, or compounds of the N-salicylidene-ethylamine type or N-N'-disalicylidene-ethylene- or triethylene-diamine.

Only neutral of basic (alkaline) fillers and additives may be used in the invention. The measure of this acidity or alkalinity is the pH value of a 10% aqueous solution of a slurry as regards fillers and solid additives, or the pH value of an aqueous solution or extract as regards liquid additives. If the pH value of such a solution or slurry or extract is equal to or larger than 7, then the tested filler or additive may be used. There are a few exceptions in the form of retarders present in low amounts, for instance oleic acid, stearic acid, salicylic acid, citric acid, nitrilo-triacetic acid or ethylene-diamino tetraacetic acid, with the latter possibly also being simultaneously complexing agents and retarders. Such materials are well known in the art.

Suitable illustrative fillers are clays, dolomite, titanium dioxide, barytes, cellulose or polyamide powders. Useful solid additives are, illustratively, alkaline earth oxides or hydroxides, molecular-sieve powders, flowers of sulfur, bentonite and possibly pigments, reaction accelerators or stabilizers. Examples of liquid additives are solvents, plasticizers such as phthalates, benzoic-acid esters, hydrogenated ter-phenyls or polyethers of high boiling points, coupling agents or liquid stabilizers, dessicants or anti-precipitants.

The sealant compositions of the invention are prepared by intensively mixing conventional, mercapto-terminated polymers and/or oligomers, fillers, plasticizers, dessicants and possibly solvents, coupling agents, pigments, complexing agents, accelerators, retarders and thixotropic agents, which together contain less than 0.01% of heavy metals. Preferably the mixing operation is carried out in vacuum, drying taking place simultaneously in order to control moisture.

Independently of the above, alkali perborate and barium oxide or strontium oxide are made into a paste together with or separately from plasticizers and any further additives. The resulting paste is then mixed with the mixture containing the polymer and/or the oligomer.

As a result of the process described above, a white injectable caulking and sealing composition is then obtained, which will be storage-stable at room temperature for several months if air is excluded. Upon contact with humid air, the composition hardens within a few days into a rubber-elastic product. This cured sealant exhibits neither discoloration nor yellowing (DIN 18540) upon aging, nor does its elastic modulus significantly increase.

DETAILED DESCRIPTION OF INVENTION

The following examples serve to illustrate details of the invention.

EXAMPLE 1

The polymer used in Example 1 is a polysulfide with the average structure:

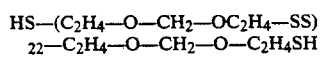

and with about 0.5% crosslinking. Its mean molecular weight is 4,000 and its viscosity is about 35–45 Pa.s at 27° C. All quantitative data refer to parts or percent by weight.

A base mixture consisting of:

1000 parts polymer as defined above,
370 parts benzylbutylphthalate,
800 parts clay
350 parts titanium dioxide (alkaline),
5 parts sodium phosphate,
20 parts molecular-sieve powder 3A,
25 parts bentonite (Bentone SD-2),
5 parts toluene are intensively mixed for 10 minutes in a planetary mixer in vacuum (600 Pa).

The mixture so prepared has a water content of 0.15% and a content in heavy metals of about 0.005%.

235 g of a paste are added to the above mixture, wherein the paste consists of the following components which are mixed in a triple roller blender 10 parts barium oxide,
30 parts sodium perborate monohydrate,
35 parts chalk,
160 parts plasticizer.

The thixotropic substance so prepared is divided into several portions used in the tests below:

(a) One portion is stored in a sealed tube at 70° C. After three week's storage, the substance is still suitable.

(b) One portion is extended to form test samples (15×15×50 mm) in accordance with DIN 18540 and is stored in the open at 23° C. and 50% relative humidity. After 100 minutes the substance exhibits a thin, tack free skin. After 1 day, the skin is 1 mm thick. After 30 days, the sample has cured into a rubber-elastic body.

The tests below are carried out by means of the samples cured under (b):

| | |
|---|---|
| Tensile stress at 100% elongation after curing: | 0.2 N/mm² |
| Recovery after 1 h elongation at 100%: | 85% |
| Modulus at 100 elongation and −20° C.: | 0.26 N/mm² |
| Modulus at 100% elongation after aging (DIN 18540): | 0.3 N/mm² |
| Discoloration after aging: | none. |

EXAMPLES 2 and 3

Single-component sealant compositions with the mercapto-terminal polymers below are prepared in a manner similar to that of Example 1 except as noted:

Again white substances curing in humid air but storage-stable when air is excluded are obtained, which neither rigidify nor yellow with aging.

The mercapto-terminated polymer used in Example 2 is an oligomeric polysulfide with the average structure below:

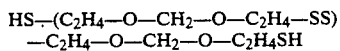

having about 2% crosslinking. Its mean molecular weight is about 1,000 and its viscosity at 27° C. is 0.7–1.2 Pa.s.

Because of the higher content in SH groups, 470 g of the paste cited in example 1 are added.

The mercapto-terminated polymer used in Example 3 is a polymeric mercaptan with the average structure below:

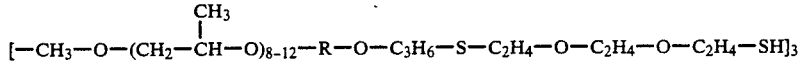

where R is an aryldiamide group.

Further variations and modifications of the foregoing will be apparent to those skilled in the art and are intended to be encompassed by the claims appended hereto.

German priority application No. P 38 09 104.6 is relied on and incorporated herein.

We claim:

1. A single-component, humidity-curing caulking and sealing composition comprising at least one mercapto-terminated polymer or oligomer or mixture thereof and as a latent hardener, an effective amount of an alkali perborate monohydrate to harden said mixed composition, as an accelerator, an effective amount of barium oxide or strontium oxide, at least one filler and at least one plasticizer for said composition, said filler and plasticizer being selected such that an aqueous slurry or aqueous extract thereof is neutral or alkaline, the heavy-metal content for the total composition being less than 0.01%, and the composition being substantially free of water.

2. The single-component sealing composition according to claim 1, wherein the content of alkali perborate monohydrate does not exceed the stoichiometrically required amount by more than 3 g/100 g of the mercapto terminated polymer and/or oligomer.

3. The single-component sealing composition according to claim 1 which additionally contains 0.005–2% by weight of a complexing agent.

4. The single-component sealing composition according to claim 3 wherein the complexing agent is an alkali salt of ethylene diaminotetraacetic acid or of nitrilotriacetic acid.

5. The single-component sealing composition according to claim 3, wherein the complexing agent is an alkali polyphosphate.

6. The single-component sealant composition according to claim 3, wherein the complexing agent is N-salicylidene ethylamine, N,N'-disalicylidene ethylene or N,N'-disalycidene triethylene diamine.

7. A process for preparing a caulking and sealing composition as defined in claim 1 comprising mixing at least one mercapto-terminated polymer or oligomer, in mixture thereof with at least one of the group of filler, plasticizer, and dessicant the resulting mixture containing less than 0.01% of heavy metals, said mixing being intensively under vacuum and to produce an essentially dry mixture, independently therefrom mixing alkali perborate and barium oxide or strontium oxide with an effective amount of a plasticizer therefor into a paste and thereafter mixing said paste with the essentially dry mixture containing the polymer and/or oligomer.

8. The process according to claim 7 wherein the polymer mixture additionally is mixed with at least one of the group of solvent, coupling agent, pigment, complexing agent, accelerator, thixotropizing agent and retarder.

* * * * *